United States Patent
Cho et al.

(10) Patent No.: US 9,293,761 B2
(45) Date of Patent: Mar. 22, 2016

(54) POSITIVE ACTIVE MATERIAL LAYER COMPOSITION FOR RECHARGEABLE LITHIUM BATTERY AND RECHARGEABLE LITHIUM BATTERY USING THE SAME

(71) Applicant: SAMSUNG SDI CO., LTD., Yongin-si, Gyeonggi-do (KR)

(72) Inventors: Chae-Woong Cho, Yongin-si (KR); Myung-Duk Lim, Yongin-si (KR); Seung-Hun Han, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 93 days.

(21) Appl. No.: 13/799,026

(22) Filed: Mar. 13, 2013

(65) Prior Publication Data

US 2014/0099545 A1    Apr. 10, 2014

(30) Foreign Application Priority Data

Oct. 5, 2012 (KR) .......................... 10-2012-0110748

(51) Int. Cl.
| | |
|---|---|
| *H01M 4/36* | (2006.01) |
| *H01M 4/48* | (2010.01) |
| *H01M 4/131* | (2010.01) |
| *H01M 4/505* | (2010.01) |
| *H01M 4/525* | (2010.01) |
| *H01M 4/62* | (2006.01) |
| *H01M 10/0525* | (2010.01) |
| *H01M 10/0569* | (2010.01) |

(52) U.S. Cl.
CPC .............. *H01M 4/131* (2013.01); *H01M 4/364* (2013.01); *H01M 4/366* (2013.01); *H01M 4/48* (2013.01); *H01M 4/505* (2013.01); *H01M 4/525* (2013.01); *H01M 4/622* (2013.01); *H01M 10/0525* (2013.01); *H01M 10/0569* (2013.01); *Y02E 60/122* (2013.01)

(58) Field of Classification Search
CPC ..... H01M 4/131; H01M 4/485; H01M 4/505; H01M 4/525
USPC ............ 429/212, 231.5, 231.3, 223, 188, 207
See application file for complete search history.

(56) References Cited

U.S. PATENT DOCUMENTS

| | | | |
|---|---|---|---|
| 2006/0134527 A1* | 6/2006 | Amine et al. ................ | 429/326 |
| 2008/0102369 A1* | 5/2008 | Sakata et al. ................. | 429/188 |
| 2010/0273055 A1* | 10/2010 | Jiang et al. .................... | 429/223 |
| 2011/0111290 A1 | 5/2011 | Uchida et al. | |

FOREIGN PATENT DOCUMENTS

| | | |
|---|---|---|
| JP | 2000-149948 A | 5/2000 |
| JP | 2007-188699 A | 7/2007 |
| JP | 4114247 B2 | 4/2008 |
| JP | 2009-076279 A | 4/2009 |
| JP | 2010-021027 A | 1/2010 |
| JP | 2010-021075 A | 1/2010 |

* cited by examiner

*Primary Examiner* — Kenneth Douyette
(74) *Attorney, Agent, or Firm* — Robert E. Bushnell, Esq.

(57) ABSTRACT

Disclosed are a positive active material layer composition for a rechargeable lithium battery including a positive active material including a lithium metal oxide and tungsten oxide ($WO_3$) coated on the surface of the lithium metal oxide and an aqueous binder, and a rechargeable lithium battery using the same.

15 Claims, 8 Drawing Sheets

Add lithium metal oxide and tungsten oxide (WO₃) particles to isopropylalcohol

Heat and agitate the mixture at a temperature ranging from about 40°C to 80°C

Dry and filter the agitated mixture

POSITIVE ACTIVE MATERIAL LAYER COMPOSITION FOR RECHARGEABLE LITHIUM BATTERY AND RECHARGEABLE LITHIUM BATTERY USING THE SAME

CLAIM PRIORITY

This application makes reference to, incorporates the same herein, and claims all benefits accruing under 35 U.S.C. §119 from and application for POSITIVE ACTIVE MATERIAL LAYER COMPOSITION FOR RECHARGEABLE LITHIUM BATTERY AND RECHARGEABLE LITHIUM BATTERY USING THE SAME earlier filed in the Korean Intellectual Property Office on 5 Oct. 2012 and there duly assigned Serial No. 10-2012-0110748.

BACKGROUND OF THE INVENTION

1. Field of the Invention

This disclosure relates to a positive active material layer composition for a rechargeable lithium battery and a rechargeable lithium battery using the same.

2. Description of the Related Art

Rechargeable lithium batteries have recently drawn attention as a power source for small portable electronic devices. They use an organic electrolyte and thereby have twice or more discharge voltage than that of a conventional battery using an alkali aqueous solution, and accordingly have high energy density.

For a positive active material of rechargeable lithium batteries, oxides including lithium and transition elements and being capable of intercalating and deintercalating lithium ions, and for example, $LiCoO_2$, $LiMn_2O_4$, $LiNi_{1-x}Co_xO_2$ (0<x<1), and the like have been used.

As for negative active materials of a rechargeable lithium battery, various carbon-based materials such as artificial graphite, natural graphite, and hard carbon, which can intercalate and deintercalate lithium ions, have been used.

On the other hand, a positive active material layer is formed by coating a positive active material layer composition including a positive active material and a binder on a current collector. When the binder is aqueous, the positive active material layer composition contains a strong base and thus, problems of corroding a current collector such as an aluminum (Al) substrate and the like, and producing $H_2$ gas, and the formulation of pin-holes on an electrode.

In order to solve these problems, Japanese Patent No. 4114247 discloses a positive active material layer composition including $MoO_3$ in an amount of 100 ppm to 10000 ppm based on a positive active material. However, the $MoO_3$ may prevent corrosion of the Al substrate but has low conductivity and thus, decreases resistance of an electrode and resultantly, deteriorates charge and discharge characteristics of a lithium rechargeable battery.

In addition, Japanese Patent Laid-Open Publication No. 2010-021027 discloses a method of coating various metal oxides on an Al substrate, which necessarily needs an additional process and thus, increases the cost.

SUMMARY OF THE INVENTION

One embodiment of the present invention provides a positive active material layer composition for a rechargeable lithium battery preventing corrosion of a positive electrode and avoiding a resistance increase of the positive electrode and thus, suppressing a swelling phenomenon.

Another embodiment of the present invention provides a rechargeable lithium battery exhibiting good cycle-life characteristics, and especially, good cycle-life characteristics at high rates, using the positive active material layer composition.

According to one embodiment of the present invention, provided is a positive active material layer composition for a rechargeable lithium battery that includes a positive active material including a lithium metal oxide and tungsten oxide ($WO_3$) coated on the surface of the lithium metal oxide; and an aqueous binder.

The lithium metal oxide may include at least one selected from a lithium cobalt oxide, a lithium nickel cobalt manganese oxide, or a lithium nickel cobalt aluminum oxide.

The lithium metal oxide may have an average particle diameter of about 5 μm to about 20 μm.

The tungsten oxide ($WO_3$) may be coated on a part of the surface of the lithium metal oxide or substantially the entire surface.

The tungsten oxide ($WO_3$) may be included in an amount of about 0.1 parts to about 5 parts by weight based on 100 parts by weight of the lithium metal oxide.

The tungsten oxide ($WO_3$) may have an average particle diameter of about 50 nm to about 1000 nm.

The positive active material may be included in an amount of about 85 wt % to about 98 wt % based on the total amount of the positive active material layer composition.

The aqueous binder may include at least one selected from fluorine-based acrylate, a styrene-butadiene rubber, an acrylated styrene-butadiene rubber (SBR), an acrylonitrile-butadiene rubber, an acrylic rubber, a butyl rubber, a fluorine rubber, polytetrafluoroethylene, polyethylene, polypropylene, ethylene-propylene copolymer, polyethyleneoxide, polyvinylpyrrolidone, polyepichlorohydrine, a polyphosphazene, a polyacrylonitrile, polystyrene, an ethylene-propylene-diene copolymer, polyvinylpyridine, a chlorosulfonated polyethylene, a latex, a polyester resin, an acrylic resin, a phenolic resin, an epoxy resin, or polyvinylalcohol.

The aqueous binder may be included in an amount of about 0.1 wt % to about 5 wt % based on the total amount of the positive active material layer composition.

The positive active material layer composition may include the positive active material and aqueous binder in a weight ratio of about 30:1 to about 200:1.

The positive active material layer composition may further include a thickener, the thickener may include at least one selected from carboxylmethyl cellulose (CMC) and hydroxypropylmethyl cellulose, and the thickener may be included in an amount of about 0.1 wt % to about 10 wt % based on the total amount of the positive active material layer composition.

The positive active material layer composition may further include a conductive material, and the conductive material may be included in an amount of about 1 wt % to about 5 wt % based on the total amount of the positive active material layer composition.

According to another embodiment of the present invention, provided is a rechargeable lithium battery that includes a positive electrode including an aluminum current collector and the positive active material layer composition disposed on the aluminum current collector; a negative electrode; and an electrolyte.

Hereinafter, further embodiments of this disclosure will be described in detail.

The present invention may use the positive active material layer composition preventing corrosion of a positive electrode and resistance increase of the positive electrode and suppressing a swelling phenomenon and thus, realize a rechargeable lithium battery having excellent cycle-life characteristic, and especially cycle-life characteristics at high rates.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
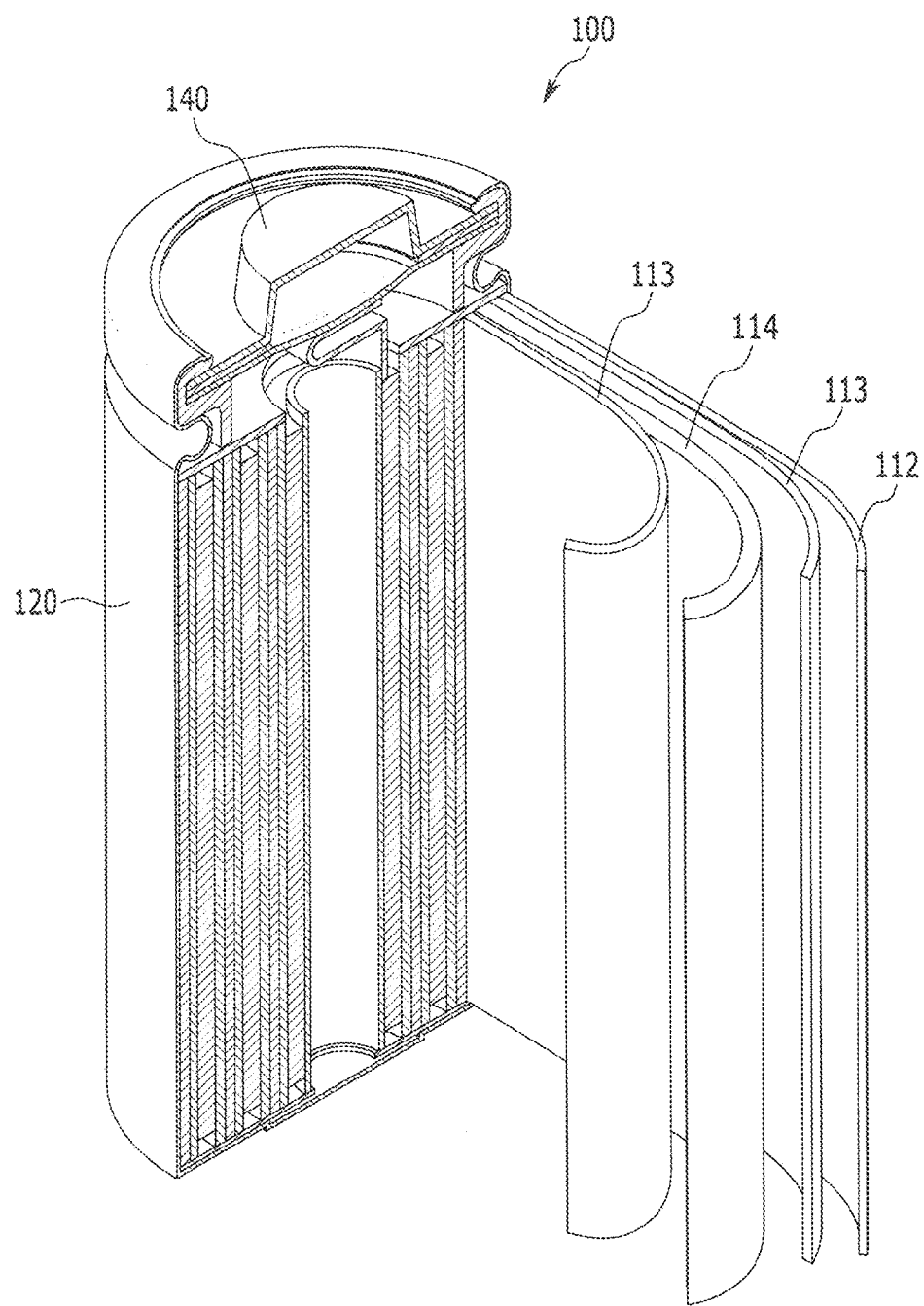
FIG. 1 is a schematic view showing a rechargeable lithium battery according to one embodiment.

Exemplary embodiments of the present disclosure will hereinafter be described in detail. However, these embodiments are only exemplary, and this disclosure is not limited thereto.

A positive active material layer composition for a rechargeable lithium battery according to one embodiment includes a positive active material including lithium metal oxide and tungsten oxide ($WO_3$) coated on the surface of the lithium metal oxide, and an aqueous binder. When the positive active material layer composition is coated on a current collector to fabricate a positive electrode, the positive active material layer composition may improve anti-corrosion of a positive electrode in the positive electrode and suppress a swelling phenomenon due to gas generation.

The lithium metal oxide may be a lithiated intercalation compound that intercalates and deintercalates lithium reversibly, and may be specifically oxide including at least one of cobalt, manganese, and nickel, or lithium.

For example, compounds represented by the following chemical formulae may be used.

$Li_aA_{1-b}R_bD_2$ ($0.90 \leq a \leq 1.8$ and $0 \leq b \leq 0.5$); $Li_aE_{1-b}R_bO_{2-c}D_c$ ($0.90 \leq a \leq 1.8$, $0 \leq b \leq 0.5$ and $0 \leq c \leq 0.05$); $LiE_{2-b}R_bO_{4-c}D_c$ ($0 \leq b \leq 0.5$, $0 \leq c \leq 0.05$); $Li_aNi_{1-b-c}Co_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_bE_cG_dO_2$ ($0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ ($0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$ and $0.001 \leq b \leq 0.1$); $Li_aMnG_bO_2$ ($0.90 \leq a \leq 1.8$ and $0.001 \leq b \leq 0.1$); $Li_aMn_2G_bO_4$ ($0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above Chemical Formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

More specific examples of the lithium metal oxide may include at least one selected from lithium cobalt oxide, lithium nickel cobalt manganese oxide, and lithium nickel cobalt aluminum oxide. The lithium cobalt oxide may be a compound represented by the following Chemical Formula 1, the lithium cobalt manganese oxide may be a compound represented by the following Chemical Formula 2, and the lithium nickel cobalt aluminum oxide may be a compound represented by the following Chemical Formula 3.

$LiCoO_2$       [Chemical Formula 1]

$Li_aNi_xCo_yMn_zO_2$       [Chemical Formula 2]

In the above Chemical Formula 2, $0.9 \leq a \leq 1.1$, $0.1 \leq x \leq 0.7$, $0.1 \leq y \leq 0.4$, $0.1 \leq z \leq 0.7$, and $x+y+z=1$.

$Li_aNi_xCo_yAl_zO_2$       [chemical Formula 3]

In the above Chemical Formula 2, $0.9 \leq a \leq 1.1$, $0.4 \leq x \leq 0.9$, $0.01 \leq y \leq 0.4$, $0.01 \leq z \leq 0.2$, and $x+y+z=1$.

The lithium metal oxide may have an average particle diameter of about 5 μm to about 20 μm, and specifically about 10 μm to about 15 μm. When the lithium metal oxide has an average particle diameter within the range, the positive active material layer composition has excellent dispersity, improves uniformity of the electrode during the coating of the positive active material layer composition, and thus, improves cycle-life and high rate cycle-life characteristics of a rechargeable lithium battery.

The positive active material may be prepared by coating the tungsten oxide ($WO_3$) wholly or partly on the surface of the lithium metal oxide. Specifically, the tungsten oxide ($WO_3$) may be coated as an island shape partly on the surface of the lithium metal oxide.

The coating may be performed by a method including, for example, a method of adding the lithium metal oxide and the tungsten oxide ($WO_3$) particles to an alcohol solvent such as isopropylalcohol, methanol, ethanol, butanol, or etc., heating and agitating the mixture at a temperature ranging from about 40° C. to 80° C. and then, drying and filtering the agitated mixture, so that the tungsten oxide ($WO_3$) is adsorbed and coated on the surface of the lithium metal oxide. Herein, the tungsten oxide ($WO_3$) particles may be added in an amount of about 10 wt % to about 20 wt %.

The tungsten oxide ($WO_3$) may be coated in an amount of 0.1 parts to 5 parts by weight and specifically, 0.1 parts to 1 part by weight based on 100 parts by weight of the lithium metal oxide. When the tungsten oxide ($WO_3$) is coated within the above range, anti-corrosion characteristics of a positive current collector may be improved without deteriorating the capacity of a rechargeable lithium battery.

The tungsten oxide (WO$_3$) may have an average particle diameter ranging from about 50 nm to about 1000 nm and specifically, from about 200 nm to about 300 nm. When the tungsten oxide (WO$_3$) has an average particle diameter within the range, the tungsten oxide (WO$_3$) particles may be uniformly adsorbed on the surface of the lithium metal oxide without agglomeration and thus, improve anti-corrosion characteristics of a positive current collector.

The positive active material having a structure coating the tungsten oxide (WO$_3$) on the surface of the lithium metal oxide may be included in an amount of about 85 wt % to about 98 wt % and specifically, about 90 wt % to about 98 wt % based on the total amount of the positive active material layer composition. When the positive active material is included within the above range, anti-corrosion characteristics of the positive current collector may be improved.

The positive active material composition may further include water as a solvent. Since the positive active material composition includes no toxic organic solvent such as N-methylpyrrolidone (NMP), the positive active material layer composition including the aqueous binder may do no harm to a human and is environmentally-friendly.

The aqueous binder may be at least one selected from fluorine-based acrylate, a styrene-butadiene rubber, an acrylated styrene-butadiene rubber (SBR), an acrylonitrile-butadiene rubber, an acrylic rubber, a butyl rubber, a fluorine rubber, polytetrafluoroethylene, polyethylene, polypropylene, an ethylene-propylene copolymer, polyethyleneoxide, polyvinylpyrrolidone, polyepichlorohydrine, a polyphosphazene, a polyacrylonitrile, polystyrene, an ethylene-propylene-diene copolymer, polyvinylpyridine, a chlorosulfonated polyethylene, a latex, a polyester resin, an acrylic resin, a phenolic resin, an epoxy resin, or polyvinylalcohol.

The aqueous binder may be included in an amount of about 0.1 wt % to about 5 wt %, and specifically about 0.5 wt % to about 2 wt % based on the total amount of the positive active material layer composition. When the aqueous binder is used within the above range, anti-corrosion characteristics of a positive current collector may be improved.

The positive active material layer composition may include the positive active material and aqueous binder in a weight ratio of about 30:1 to about 200:1, and specifically about 90:1 to about 130:1. When the positive active material and aqueous binder are used within the weight ratio range, anti-corrosion characteristics of the positive current collector may be improved.

The positive active material layer composition may further include a thickener as well as the positive active material and aqueous binder.

The thickener may add viscosity to the aqueous binder having no viscosity and also, plays a role of adding ion conductivity thereto.

The thickener may include at least one selected from carboxylmethyl cellulose (CMC) and hydroxypropyl methylcellulose, but is not limited thereto.

The thickener may be included in an amount of about 0.1 wt % to about 10 wt %, and specifically about 0.1 wt % to about 5 wt % based on the total amount of the positive active material layer composition. When the thickener is used within the above range, hardness of an electrode plate as well as sedimentation may be simultaneously prevented.

The positive active material layer composition may further include a conductive material.

The conductive material is used in order to improve conductivity of an electrode. Any electrically conductive material may be used as a conductive material unless it causes a chemical change. Examples of the conductive material include carbon-based materials such as natural graphite, artificial graphite, carbon black, acetylene black, ketjen black, a carbon fiber, and the like; a metal-based material of a metal powder or a metal fiber copper including nickel, aluminum, silver, and the like; a conductive polymer such as a polyphenylene derivative, and the like; or mixtures thereof.

The conductive material may be included in an amount of about 1 wt % to about 5 wt %, and specifically about 1 wt % to about 3 wt % based on the total amount of the positive active material layer composition.

The positive active material layer composition may be prepared, for example, in the following method.

The positive active material prepared by coating the tungsten oxide (WO$_3$) on the surface of the lithium metal oxide is mixed with the conductive material and the thickener and dissolved in water, preparing a composition, e.g. a paste composition. Next, the composition is diluted by adding water in an appropriate amount thereto, and the aqueous binder is added thereto. The resulting mixture is additionally agitated.

The positive active material layer composition is coated to be about 15 μm to about 30 μm thick on a positive current collector such as aluminum to fabricate a positive electrode having excellent anti-corrosion properties.

In general, a positive active material layer contains a strong base when Li ions unreacted in the positive active material during charge and discharge are dissociated and thus, produces a lower pH and simultaneously, corrodes a positive electrode and produces numerous pin-holes on the electrode, deteriorating charge and discharge characteristics. According to one embodiment of the present invention, the positive active material having a structure of coating the tungsten oxide (WO$_3$) on the surface of the lithium metal oxide is used to prevent dissociation of Li ions out of the positive active material and thus, pH deterioration of an aqueous positive active material layer composition. Accordingly, the positive electrode plate is prevented from corrosion under strong base conditions, improving charge and discharge characteristics of a rechargeable lithium battery.

According to another embodiment, a rechargeable lithium battery including a positive electrode manufactured using the positive active material layer composition is provided.

Hereinafter, the rechargeable lithium battery is described referring to FIG. 1.

FIG. 1 is a schematic view showing a rechargeable lithium battery according to one embodiment. FIG. 1 shows a cylindrical rechargeable lithium battery, but the rechargeable lithium battery is not limited thereto.

Referring to FIG. 1, a rechargeable lithium battery 100 according to one embodiment includes an electrode assembly including a positive electrode 114, a negative electrode 112 facing the positive electrode 114, a separator 113 interposed between the negative electrode 112 and the positive electrode 114, an electrolyte (not shown) impregnating the separator 113, a battery case 120, and a sealing member 140 sealing the battery case 120.

The positive electrode 114 may be a positive electrode manufactured using the positive active material layer composition.

The negative electrode 112 includes a negative current collector and a negative active material layer disposed on the negative current collector.

The negative current collector may be a copper foil, a nickel foil, a stainless steel foil, a titanium foil, a nickel foam, a copper foam, a polymer substrate coated with a conductive metal, or a combination thereof, but is not limited thereto.

The negative active material layer includes the above negative active material, a binder, and optionally a conductive material.

The negative active material includes a material that reversibly intercalates/deintercalates lithium ions, a lithium metal, a lithium metal alloy, a material being capable of doping/dedoping lithium, or a transition metal oxide.

The material that can reversibly intercalate/deintercalate lithium ions includes a carbon material. The carbon material may be any generally-used carbon-based negative active material in a lithium ion rechargeable battery. Examples of the carbon material include crystalline carbon, amorphous carbon, or mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, $SiO_x$ ($0<x<2$), a Si—Y alloy (wherein Y is an element selected from an alkali metal, an alkaline-earth metal, Group 13 to Group 16 elements, a transition element, a rare earth element, and combinations thereof, but not Si), Sn, $SnO_2$, a Sn—Y alloy (wherein Y is an element selected from an alkali metal, an alkaline-earth metal, Group 13 to Group 16 elements, a transition element, a rare earth element, and combinations thereof, but not Sn), and the like. At least one of these materials may be mixed with $SiO_2$. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

The transition elements oxide may include vanadium oxide, lithium vanadium oxide, and the like.

The binder improves binding properties of negative active material particles with one another and with a current collector. The binder may include a non-water-soluble binder, a water-soluble binder, or a combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may include a styrene-butadiene rubber, an acrylated styrene-butadiene rubber, polyvinylalcohol, sodium polyacrylate, a copolymer of propylene and C2 to C8 olefin, a copolymer of (meth)acrylic acid and (meth)acrylic acid alkylester, or a combination thereof.

When the water-soluble binder is used as a negative electrode binder, a cellulose-based compound may be further used to provide viscosity. The cellulose-based compound includes one or more of carboxylmethyl cellulose, hydroxypropyl cellulose, hydroxypropylmethyl cellulose, diacetyl cellulose, methyl cellulose, or alkaline metal salts thereof. The alkaline metal may be Na, K, or Li.

The cellulose-based compound may be included in an amount of about 0.1 to about 3 parts by weight based on 100 parts by weight of the negative active material.

The conductive material is included to improve electrode conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or mixtures thereof.

The negative electrode may be fabricated by a method including mixing the negative active material, a conductive material, and a binder in a solvent to prepare an active material composition and coating the composition on a negative current collector.

The electrolyte includes a non-aqueous organic solvent and a lithium salt. The non-aqueous organic solvent acts as a medium for transmitting ions taking part in the electrochemical reaction of the battery. The non-aqueous organic solvent may be selected from a carbonate-based, ester-based, ether-based, ketone-based, alcohol-based, or aprotic solvent.

The carbonate-based solvent may include, for example dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

When the carbonate-based solvent is prepared by mixing a cyclic carbonate compound and a linear carbonate compound, a solvent having a low viscosity while having an increased dielectric constant may be obtained. The cyclic carbonate compound and linear carbonate compound are mixed together at the volume ratio of about 1:1 to about 1:9.

The ester-based solvent may include, for example methyl acetate, ethyl acetate, n-propyl acetate, dimethyl acetate, methyl propionate, ethyl propionate, γ-butyrolactone, decanolide, valerolactone, mevalonolactone, caprolactone, or the like. The ether-based solvent may include, for example dibutylether, tetraglyme, diglyme, dimethoxyethane, 2-methyltetrahydrofuran, tetrahydrofuran, and the like, and ketone-based solvent may include cyclohexanone, and the like. The alcohol-based compound may include ethanol, isopropyl alcohol, and the like.

The non-aqueous organic solvent may be used singularly or in a mixture. When the organic solvent is used in a mixture, the mixture ratio can be controlled in accordance with desirable battery performance.

The non-aqueous organic solvent may further include an aromatic hydrocarbon-based solvent as well as the carbonate-based solvent. The carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by the following Chemical Formula 3.

[Chemical Formula 3]

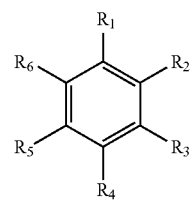

In the above Chemical Formula 3, $R_1$ to $R_6$ are independently hydrogen, a halogen, a C1 to C10 alkyl, a C1 to C10 haloalkyl, or a combination thereof.

The aromatic hydrocarbon-based organic solvent may include benzene, fluorobenzene, 1,2-difluorobenzene, 1,3- difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The electrolyte may further include vinylene carbonate or an ethylene carbonate-based compound represented by the following Chemical Formula 4 to improve cycle life.

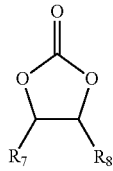

[Chemical Formula 4]

In the above Chemical Formula 4, $R_7$ and $R_8$ are independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound may be flexibly used within an appropriate range.

The lithium salt is dissolved in an organic solvent, supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, $LiB(C_2O_4)_2$ (lithium bis(oxalato) borate; LiBOB), and combinations thereof. The lithium salt may be used in a concentration ranging from about 0.1 M to about 2.0 M. When the lithium salt is included at the above concentration range, an electrolyte may have optimal electrolyte conductivity and viscosity, and may thus have enhanced performance and effective lithium ion mobility.

The separator 113 may include any materials commonly used in the conventional lithium battery as long as it separates a negative electrode 112 from a positive electrode 114 and provides a transporting passage for lithium ions. In other words, the separator 113 may have a low resistance to ion transportation and excellent impregnation for an electrolyte. For example, it may be selected from glass fiber, polyester, TEFLON (tetrafluoroethylne), polyethylene, polypropylene, polytetrafluoroethylene (PTFE), or a combination thereof. It may have a form of a non-woven fabric or a woven fabric. For example, a polyolefin-based polymer separator such as polyethylene, polypropylene or the like is mainly used for a lithium ion battery. In order to ensure the heat resistance or mechanical strength, a coated separator including a ceramic component or a polymer material may be used. Selectively, it may have a mono-layered or multi-layered structure.

The following examples illustrate the invention in more detail. These examples, however, are not in any sense to be interpreted as limiting the scope of the invention.

Example 1

A positive active material was prepared by mixing 96 wt % of $Li(Ni_{0.8}Co_{0.15}Al_{0.05})O_2$ with an average particle diameter of about 15 μm to 20 μm and 0.5 wt % of $WO_3$ having an average particle diameter of 250 nm and agitating the mixture for 12 hours to coat the $WO_3$ on the surface of the $Li(Ni_{0.8}Co_{0.15}Al_{0.05})O_2$. The positive active material was mixed with 2 wt % of carbon black and 0.7 wt % of carboxylmethylcellulose (CMC), and the resulting mixture was agitated with water, preparing a paste composition. The paste composition was diluted by adding water in an appropriate amount thereto. Then, 0.8 wt % of fluorine-based acrylate was added to the resulting product, preparing a positive active material layer composition. The positive active material layer composition was coated on a 20 μm-thick aluminum foil, dried, and compressed, fabricating a positive electrode.

On the other hand, a negative active material layer composition was prepared by mixing graphite, carboxylmethylcellulose (CMC), and a styrene-butadiene rubber (SBR) in a weight ratio of 98:1:1 in water. The negative active material layer composition was coated on a 15 μm-thick copper foil, dried, and compressed, fabricating a negative electrode.

Then, an electrolyte solution was prepared by mixing ethylenecarbonate (EC), dimethylcarbonate (DMC), and ethylmethylcarbonate (EMC) in a volume ratio of 1:1:1 and dissolving 1M of $LiPF_6$ in the mixed solvent.

The positive electrode, the negative electrode, and the electrolyte solution were used with a polyethylene separator, fabricating a rechargeable lithium battery cell.

Comparative Example 1

96.5 wt % of $Li(Ni_{0.8}Co_{0.15}Al_{0.05})O_2$, 2 wt % of carbon black, and 0.7 wt % of carboxylmethylcellulose (CMC) were mixed together, and the mixture was agitated with water, preparing a paste composition. Then, the paste composition was diluted by adding water in an appropriate amount thereto. Next, 0.8 wt % of fluorine-based acrylate was added to the diluted paste composition. The mixture was agitated, preparing a positive active material layer composition. The positive active material layer composition was coated on a 20 μm-thick aluminum foil, dried, and compressed, fabricating a positive electrode.

The positive electrode was used to fabricate a rechargeable lithium battery cell according to the same method as Example 1.

Evaluation 1: SEM Photograph of Positive Active Material

Figure 2:
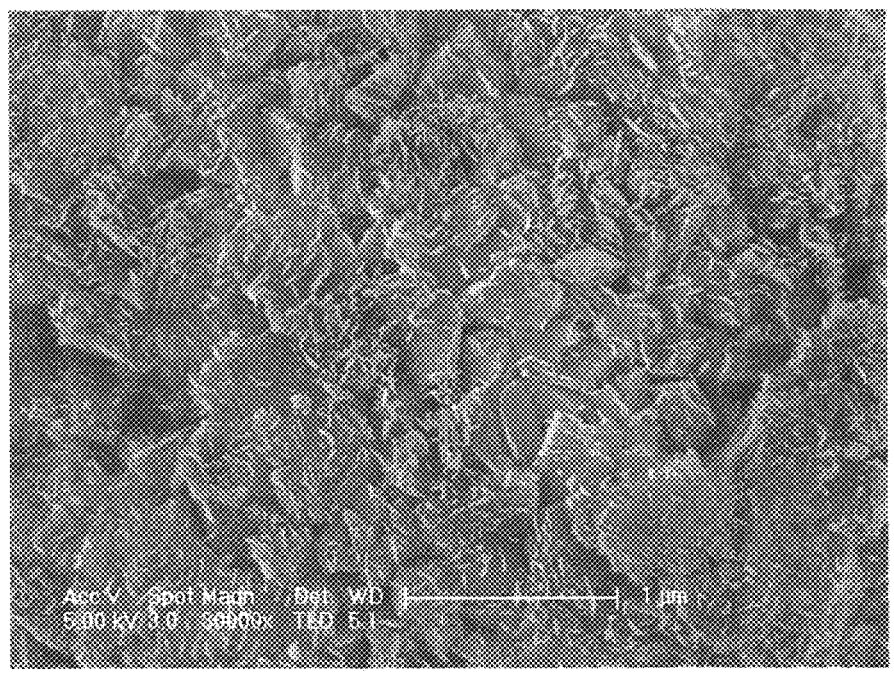
FIG. 2 is a scanning electronic microscope (SEM) photograph showing a positive active material of Example 1.
Figure 3:
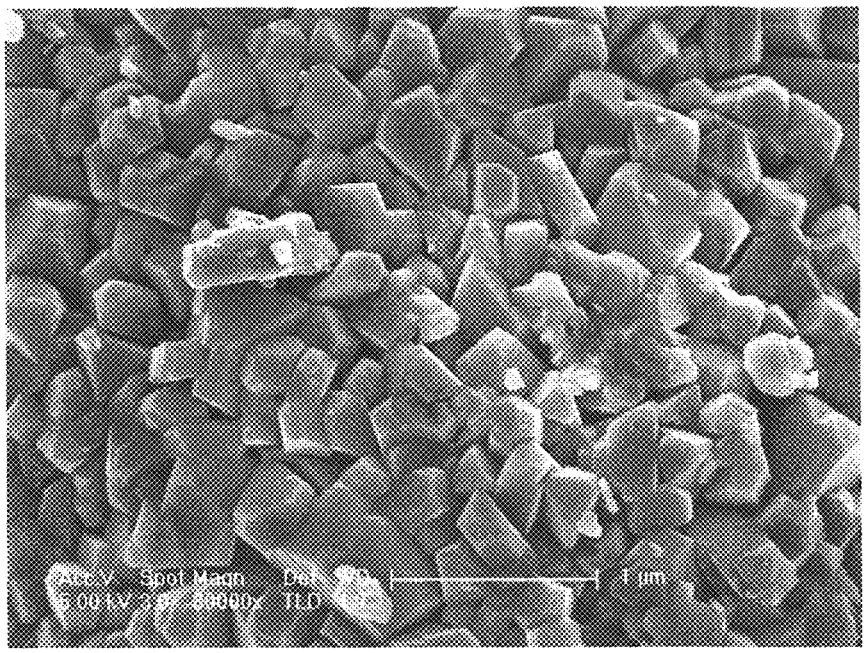
FIG. 3 is a scanning electronic microscope (SEM) photograph showing a positive active material of Comparative Example 1.

FIG. 2 is a scanning electronic microscope (SEM) photograph showing the positive active material according to Example 1, FIG. 3 is a scanning electronic microscope (SEM) photograph showing the positive active material according to Comparative Example 1.

Referring to FIGS. 2 and 3, the positive active material of Example 1 was prepared by coating tungsten oxide ($WO_3$) at least partly coated on the surface of the lithium metal oxide unlike the one of Comparative Example 1.

Evaluation 2: pH Change and Corrosion Evaluation of Positive Active Material Layer Composition In order to evaluate the pH change of the positive active material layer compositions according to Example 1 and Comparative Example 1, formation of the rechargeable lithium battery cells fabricated were charged and discharged twice at 0.1 C (formation), and charged at 3.0V with a cut-off of 0.8 C and discharged at 4.2V with a cut-off of 1.0 C and then, decomposed to examine pH change and surface shape in a positive electrode.

Figure 4:
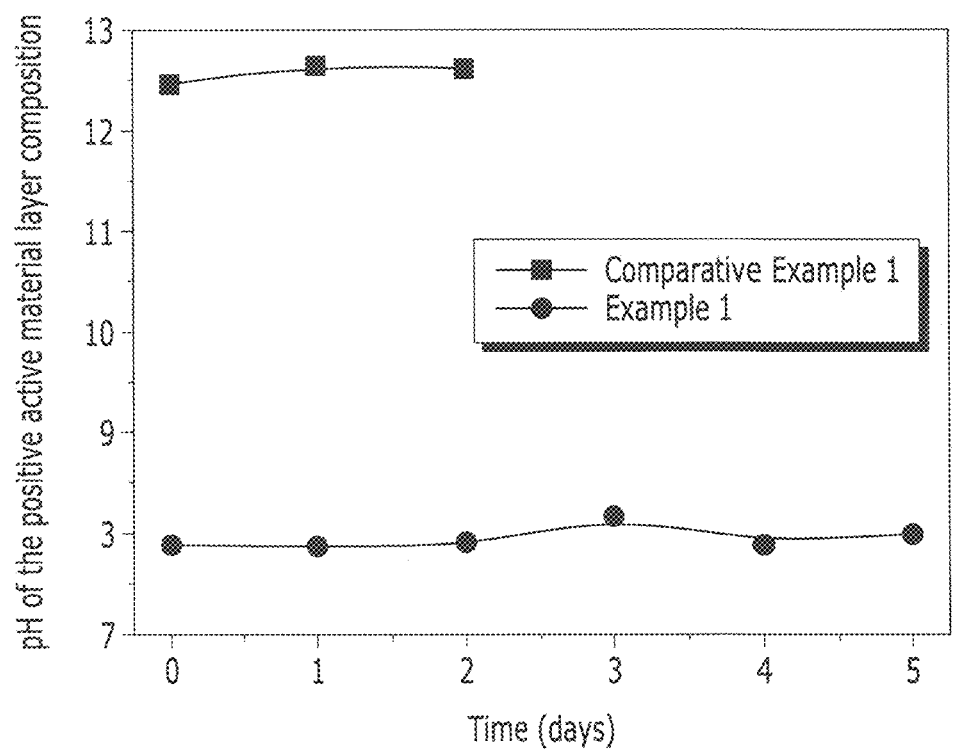
FIG. 4 is a graph showing pH change of the positive active material layer compositions of Example 1 and Comparative Example 1.
Figure 5:
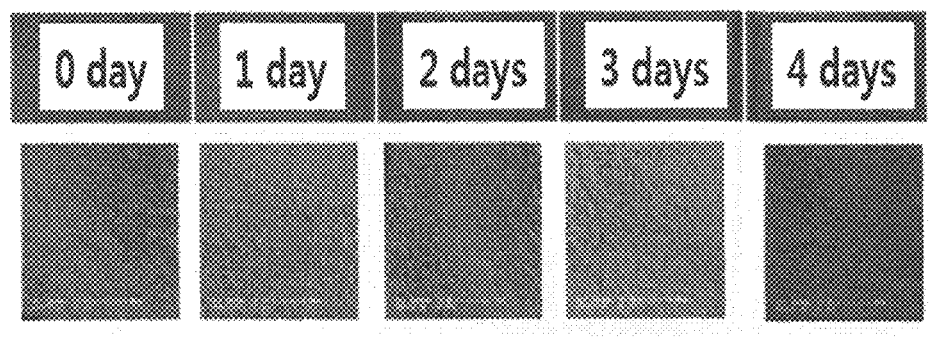
FIG. 5 is a scanning electronic microscope (SEM) photograph showing the positive electrode state of a positive electrode in Example 1.

FIG. 4 is a graph showing pH change of the positive active material layer compositions according to Example 1 and Comparative Example 1. FIG. 5 is a scanning electronic microscope (SEM) photograph showing the state of an electrode in the positive electrode according to Example 1, and FIG. 6 is a scanning electronic microscope (SEM) photograph showing the state change of an electrode in the positive electrode according to Comparative Example 1.

Figure 6:
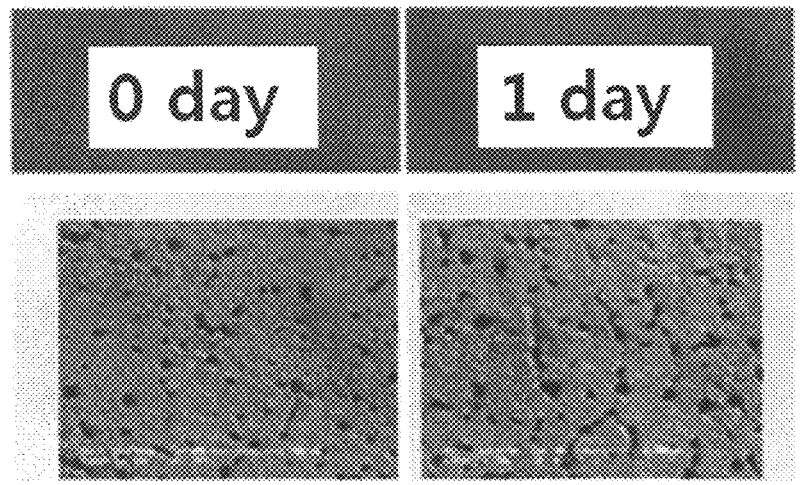
FIG. 6 is a scanning electronic microscope (SEM) photograph showing the positive electrode state of a positive electrode in Comparative Example 1.

Referring to FIGS. 4 to 6, the positive active material layer composition according to Comparative Example 1 had pH of a very strong base, and shows pin-holes were excessively generated on the electrode in the positive electrode from the $0^{th}$ day. On the other hand, the positive active material layer composition according to Example 1 had almost no holes on the electrode plate even on the fourth day. Accordingly, the tungsten oxide ($WO_3$) suppressed pH increase of the positive active material layer composition and thus, prevents corrosion and destruction of the electrode and decreases resistance, improving charge and discharge characteristic.

Evaluation 3: Cycle-Life Characteristic of Rechargeable Lithium Battery Cell

The rechargeable lithium battery cells according to Example 1 and Comparative Example 1 were evaluated regarding cycle-life characteristics by the following method.

The rechargeable lithium battery cells according to Example 1 and Comparative Example 1 were twice charged and discharged at 25° C. with 0.1 C (formation) and charged with 0.8 C and a cut-off of 3.0V and discharged with 1.0 C and a cut-off of 4.2V as one cycle. The cycle was 100 times repeated.

The cycle-life characteristics were evaluated using capacity retention (%). The capacity retention (%) was obtained as a percentage of discharge capacity at the 100th cycle related to the initial discharge capacity. The results are provided in FIG. 7.

Figure 7:
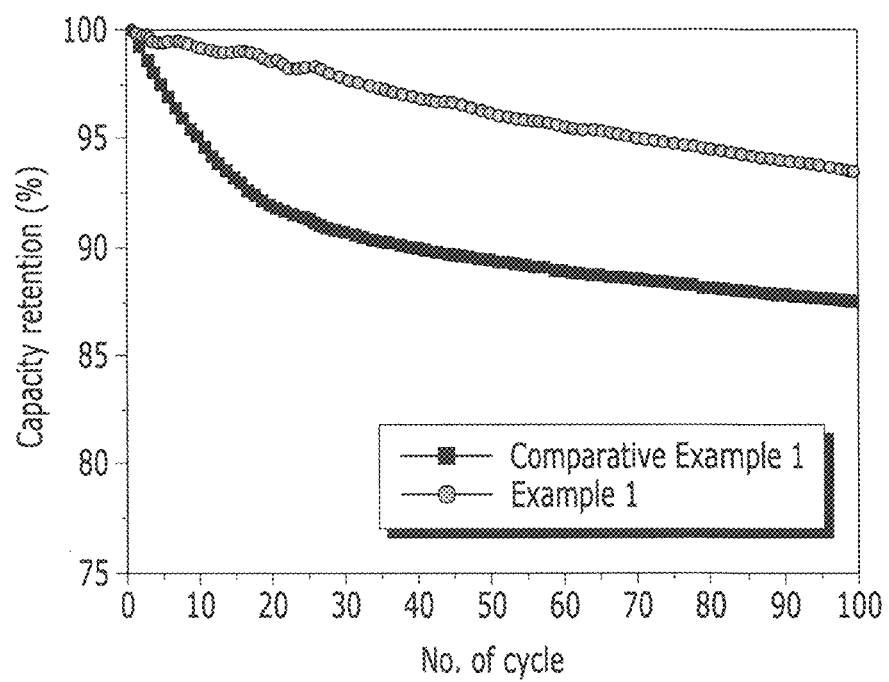
FIG. 7 is a graph showing cycle-life characteristics of the rechargeable lithium batteries of Example 1 and Comparative Example 1.

FIG. 7 is a graph showing cycle-life characteristics of the rechargeable lithium battery cells according to Example 1 and Comparative Example 1.

Referring to FIG. 7, the rechargeable lithium battery cell according to Example 1 had higher capacity retention than that of the rechargeable lithium battery cell according to Comparative Example 1. The rechargeable lithium battery cell according to Comparative Example 1 had a plurality of pin-holes generated in the electrode due to corrosion of the electrode during the charge and discharge, which remarkably increased resistance of the electrode and deteriorated capacity retention (%).

Evaluation 4: High Rate Cycle-Life Characteristic of Rechargeable Lithium Battery Cell The rechargeable lithium battery cells according to Example 1 and Comparative Example 1 were evaluated regarding high rate cycle-life characteristics.

The rechargeable lithium battery cells according to Example 1 and Comparative Example 1 were respectively once charged and discharged with 0.2 C, 0.4 C, 0.6 C, 0.8 C, and 1.0 C.

The high rate cycle-life characteristics were evaluated using rate capability (%). The rate capability (%) was obtained as a percentage of each rate capacity related to initial capacity. The results are shown in FIG. 8.

Figure 8:
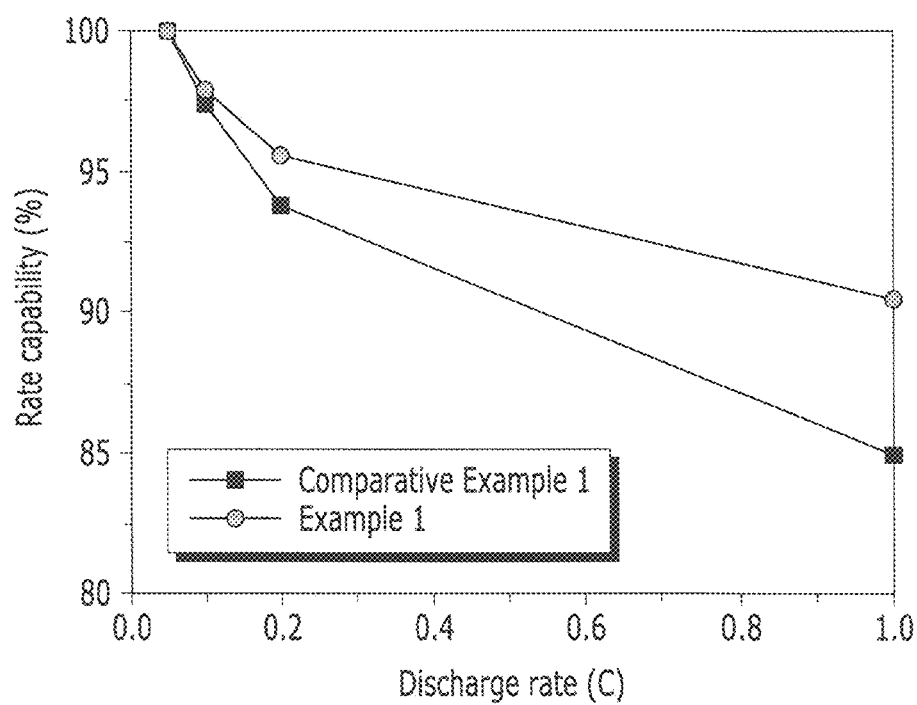
FIG. 8 is a graph showing high rate cycle-life characteristics of the rechargeable lithium batteries of Example 1 and Comparative Example 1.
Figure 9:
FIG. 9 is a flowchart showing a general exemplary method of preparing a positive active material composition of the present invention.
Figure 9:

FIG. 8 is a graph showing high rate cycle-life characteristics of the rechargeable lithium battery cells according to Example 1 and Comparative Example 1.

Referring to FIG. 8, the rechargeable lithium battery cell according to Example 1 had excellent high rate cycle-life characteristics compared with Comparative Example 1.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A positive active material layer composition for a rechargeable lithium battery, comprising:
a positive active material comprising a plurality of lithium metal oxide particles and tungsten oxide ($WO_3$) disposed on either a part of a surface of individual lithium metal oxide particles or on substantially an entire surface wherein the lithium metal oxide has an average particle diameter of about 5 μm to about 20 μm; and
an aqueous binder.

2. The positive active material layer composition for a rechargeable lithium battery of claim 1, wherein the lithium metal oxide comprises at least one selected from a lithium cobalt oxide, a lithium nickel cobalt manganese oxide, or a lithium nickel cobalt aluminum oxide.

3. The positive active material layer composition for a rechargeable lithium battery of claim 1, wherein the tungsten oxide ($WO_3$) is disposed on a part of a surface of individual lithium metal oxide particles.

4. The positive active material layer composition for a rechargeable lithium battery of claim 1, wherein the tungsten oxide ($WO_3$) is included in an amount of about 0.1 parts to about 5 parts by weight based on 100 parts by weight of the lithium metal oxide.

5. The positive active material layer composition for a rechargeable lithium battery of claim 1, wherein the tungsten oxide ($WO_3$) has an average particle diameter of about 50 nm to about 1000 nm.

6. The positive active material layer composition for a rechargeable lithium battery of claim 1, wherein the positive active material is included in an amount of about 85 wt % to about 98 wt % based on the total amount of the positive active material layer composition.

7. The positive active material layer composition for a rechargeable lithium battery of claim 1, wherein the aqueous binder comprises at least one selected from a fluorine-based acrylate, a styrene-butadiene rubber, an acrylated styrene-butadiene rubber (SBR), an acrylonitrile-butadiene rubber, an acrylic rubber, a butyl rubber, a fluorine rubber, polytetrafluoroethylene, polyethylene, polypropylene, an ethylene-propylene copolymer, polyethyleneoxide, polyvinylpyrrolidone, polyepichlorohydrine, a polyphosphazene, a polyacrylonitrile, polystyrene, an ethylene-propylene-diene copolymer, polyvinylpyridine, a chlorosulfonated polyethylene, a latex, a polyester resin, an acrylic resin, a phenolic resin, an epoxy resin, or polyvinylalcohol.

8. The positive active material layer composition for a rechargeable lithium battery of claim 1, wherein the aqueous binder is included in an amount of about 0.1 wt % to about 5 wt % based on the total amount of the positive active material layer composition.

9. The positive active material layer composition for a rechargeable lithium battery of claim 1, wherein the positive active material layer composition comprises the positive active material and aqueous binder in a weight ratio of about 30:1 to about 200:1.

10. The positive active material layer composition for a rechargeable lithium battery of claim 1, wherein the positive active material layer composition further comprises a thickener.

11. The positive active material layer composition for a rechargeable lithium battery of claim 10, wherein the thickener comprises at least one selected from carboxylmethyl cellulose (CMC) or hydroxypropylmethyl cellulose.

12. The positive active material layer composition for a rechargeable lithium battery of claim 10, wherein the thickener is included in an amount of about 0.1 wt % to about 10 wt % based on the total amount of the positive active material layer composition.

13. The positive active material layer composition for a rechargeable lithium battery of claim 1, wherein the positive active material layer composition further comprises a conductive material.

14. The positive active material layer composition for a rechargeable lithium battery of claim 13, wherein the conductive material is included in an amount of about 1 wt % to about 5 wt % based on the total amount of the positive active material layer composition.

15. A rechargeable lithium battery, comprising:
 a positive electrode including an aluminum substrate and the positive active material layer composition of claim 1 disposed on the aluminum substrate;
 a negative electrode; and
 an electrolyte.

* * * * *